US012101454B2

(12) United States Patent
Xu et al.

(10) Patent No.: US 12,101,454 B2
(45) Date of Patent: *Sep. 24, 2024

(54) SYSTEM AND METHOD FOR SOCIAL IMMERSIVE CONTENT RENDERING

(71) Applicant: AT&T Intellectual Property I, L.P., Atlanta, GA (US)

(72) Inventors: Tan Xu, Bridgewater, NJ (US); Eric Zavesky, Austin, TX (US); Allyson King, Murphy, TX (US); Jianxiong Dong, Pleasanton, CA (US); David Crawford Gibbon, Lincroft, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 186 days.

This patent is subject to a terminal disclaimer.

(21) Appl. No.: 17/946,171

(22) Filed: Sep. 16, 2022

(65) Prior Publication Data

US 2023/0011822 A1 Jan. 12, 2023

Related U.S. Application Data

(63) Continuation of application No. 17/141,407, filed on Jan. 5, 2021, now Pat. No. 11,483,533.

(51) Int. Cl.
*H04N 13/156* (2018.01)
*G02B 27/01* (2006.01)
(Continued)

(52) U.S. Cl.
CPC ....... *H04N 13/156* (2018.05); *G02B 27/0172* (2013.01); *H04N 13/111* (2018.05); *H04N 13/167* (2018.05)

(58) Field of Classification Search
CPC .. H04N 13/156; H04N 13/111; H04N 13/167; G02B 27/0172
(Continued)

(56) References Cited

U.S. PATENT DOCUMENTS 6,317,127 B1 11/2001 Daily et al.
7,920,071 B2 4/2011 Baillot
(Continued)

OTHER PUBLICATIONS https://about.fb.com/realitylabs/projectaria/; Dec. 2, 2020; pp. 1-8.
(Continued)

*Primary Examiner* — Tung T Vo
(74) *Attorney, Agent, or Firm* — Guntin & Gust, PLC; Robert Gingher

(57) ABSTRACT

Aspects of the subject disclosure may include, for example, a processing system including a processor and a memory that stores executable instructions that, when executed by the processing system, facilitate performance of operations including receiving immersive media content; creating foreground information for rendering foreground video content of the immersive media content; receiving a first point-of-view (PoV) of a first viewer operating a first display device; generating a background video content from the immersive media content; sending the foreground information to the first display device; and sending a first portion of the background video content to the first display device, wherein the first portion is based on the first PoV. Other embodiments are disclosed.

20 Claims, 9 Drawing Sheets

(51) Int. Cl.
*H04N 13/111* (2018.01)
*H04N 13/167* (2018.01)

(58) Field of Classification Search
USPC .......................................................... 348/43
See application file for complete search history.

(56) References Cited

U.S. PATENT DOCUMENTS

| | | | |
|---|---|---|---|
| 8,761,962 | B2 | 6/2014 | Seok |
| 9,013,550 | B2 | 4/2015 | Jiang et al. |
| 9,075,563 | B2 | 7/2015 | Kim |
| 9,550,419 | B2 | 1/2017 | Habashima et al. |
| 9,779,548 | B2 | 10/2017 | Weisman et al. |
| 10,162,998 | B2 | 12/2018 | Park |
| 10,339,711 | B2 | 7/2019 | Ng-Thow-Hing et al. |
| 10,721,280 | B1 * | 7/2020 | Heppner ............... H04L 65/403 |
| 2011/0293180 | A1 * | 12/2011 | Criminisi ................. G06K 9/34 382/173 |
| 2015/0175068 | A1 | 6/2015 | Szostak et al. |
| 2018/0284872 | A1 * | 10/2018 | Schluessler ........... G06F 1/3265 |
| 2019/0311548 | A1 * | 10/2019 | Wang ..................... G06T 19/00 |
| 2021/0263585 | A1 * | 8/2021 | Botta ...................... G06F 3/011 |
| 2021/0266613 | A1 * | 8/2021 | da Silva Pratas Gabriel ............. H04N 21/236 |
| 2022/0217317 | A1 | 7/2022 | Xu et al. |

OTHER PUBLICATIONS https://hubs.mozilla.com/ngSvFdg/colorful-bubbly-assembly; Dec. 2, 2020; 1 page.
https://skarredghost.com/2020/04/18/oculus-quest-ar-home-menu/; Dec. 2, 2020; pp. 1-7.
https://virtualrealitytimes.com/2020/05/14/spatial-offers-free-access-to-ar-vr-holographic-meeting-app/; Dec. 2, 2020; pp. 1-13.
Adams, E., "Drive a Car Like You'd Fly an F-35 With Augmented Reality", wired.com/2017/02/drive-car-like-youd-fly-f-35-augmented-reality, Feb. 2, 2017, 5 pages.
Auer, Thomas et al., "The integration of optical and magnetic tracking for multi-user augmented reality", Computers & Graphics 23, 1999, 4 pages.
Gimeno, Jesus et al., "Multiuser Augmented Reality System for Indoor Exhibitions", INTERACT 2011, Part IV, LNCS 6949, 2011, 4 pages.
Grasset, Raphael et al., "MARE: Multiuser Augmented Reality Environment on real table setup", 2002, 2 pages.
Kasahara, Shunichi et al., "Second surface: multi-user spatial collaboration system based on augmented reality", 2012, 5 pages.
Ochanji, Sam, https://vrroom.buzz/vr-news/entertainment/watch-360-film-festival-lineup-vrrooms-app; Dec. 2, 2020; pp. 1-5.
Palladino, Tomm, "Augmented Reality in Cars—the Companies & Tech Driving Us into the Future", Jan. 31, 2018, 12 pages.
Park, Kyung S. et al., "Disposition of Information Entities and Adequate Level of Information Presentation in an In-Car Augmented Reality Navigation System", Human Interface, Part Ii, Hcii 2007, LNCS 4558, 2007, 11 pages.
Seung, Jun K. et al., "Simulated Augmented Reality Windshield Display as a Cognitive Mapping Aid for Elder Driver Navigation", CHI 2006, Navigation, Apr. 6, 2009, 10 pages.
Shahid, Muhammad et al., "Eye-Gaze and Augmented Reality Framework for Driver Assistance", Life Science Journal 2013; 10(3), Aug. 21, 2013, 8 pages.
Tripapina, Irina, "Remote Multi-User AR is on the Rise", VRScout, Jun. 8, 2019, 10 pages.
Wagner, Daniel et al., "Towards Massively Multi-User Augmented Reality on Handheld Devices", 2005, 12 pages.

* cited by examiner

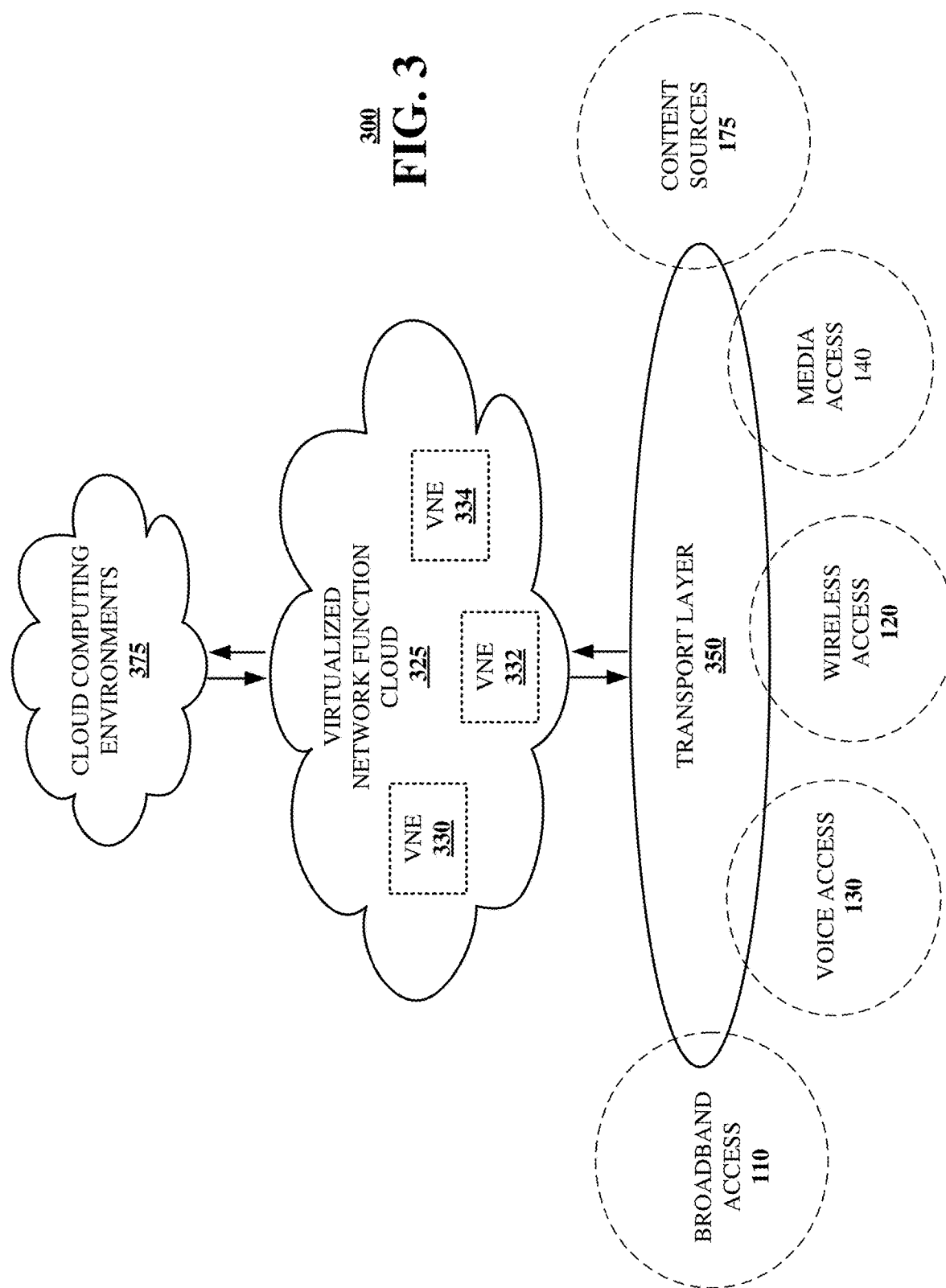

SYSTEM AND METHOD FOR SOCIAL IMMERSIVE CONTENT RENDERING

CROSS REFERENCE TO RELATED APPLICATIONS

This application is a continuation of U.S. patent application Ser. No. 17/141,407 filed on Jan. 5, 2021. All sections of the aforementioned application are incorporated by reference herein in their entirety.

FIELD OF THE DISCLOSURE

The subject disclosure relates to a system and method for social immersive content rendering.

BACKGROUND

Spherical videos, also known as 360-degree videos, provide viewers with a panoramic view that allows the viewer to freely control their viewing directions during video playback. Spherical videos are recorded by omnidirectional cameras or camera array systems (e.g., FACEBOOK® Surround 360) facing outward from a particular point of view (PoV). These multiple cameras simultaneously record all 360 degrees of a scene that can be "wrapped" onto a 3D sphere via video stitching. Spherical videos can be either monoscopic (direct one image for both eyes) or stereoscopic (direct each eye with different images for a 3D effect). Unlike 360-degree videos, which do not have depth information, volumetric videos capture the full 3D space, and allow a viewer not only to control her viewing direction, but also can relocate their PoV, which is commonly known as having six degrees of freedom (6DoF). Volumetric videos can be created by 3D modeling or various volumetric capturing techniques, e.g., using multiple red-green-blue-depth (RGB-D) cameras (e.g., offered by Microsoft Kinect, Intel RealSense) and various LIDAR scanners, which convert real world into 3D data. This 3D data then can be used to reproduce high-quality images about the real world and allows viewer to explore spatialized content from any viewpoint. Collectively, spherical video content and volumetric video content are also known as immersive media content. Social entertainment of such immersive media content brings more engagement and enjoyment, but with more challenges because there are multiple users interacting with the content, the environment and each other. Especially for off-site or asynchronous companions, digital avatars need to be driven by user activities, e.g., gesture, voice, and gaze, and synchronized within the same media, so that individual users can share their experience in an immersive fashion.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein;

DETAILED DESCRIPTION

The subject disclosure describes, among other things, illustrative embodiments for a system and method that for experiencing immersive media content by an audience together in one or more locations. Other embodiments are described in the subject disclosure.

One or more aspects of the subject disclosure include a processing system including a processor and a memory that stores executable instructions that, when executed by the processing system, facilitate performance of operations including receiving immersive media content; creating foreground information for rendering foreground video content of the immersive media content; receiving a first point-of-view (PoV) of a first viewer operating a first display device; generating a background video content from the immersive media content; sending the foreground information to the first display device; and sending a first portion of the background video content to the first display device, wherein the first portion is based on the first PoV.

One or more aspects of the subject disclosure include a machine-readable medium, comprising executable instructions that, when executed by a processing system including a processor, facilitate performance of operations including tracking a location and orientation of a first viewer of immersive media content in a room, thereby creating first avatar information; separating first audio information provided by the first viewer from audio signals of the immersive media content supplied to the room; and providing the first avatar information and the first audio information to a remote location, wherein equipment of the remote location can facilitate creation and presentation of an avatar for the first viewer based on the first avatar information merged with the presentation of the immersive media content.

One or more aspects of the subject disclosure include a method of receiving. by a processing system including a processor, immersive media content; receiving, by the processing system, a first point-of-view (PoV) of a first viewer of the immersive media content; receiving, by the processing system, a second PoV of a second viewer of the immersive media content; determining, by the processing system, a collective PoV from the first PoV and the second PoV; generating, by the processing system, a background video content stream from the immersive media content based on the collective POV; and incorporating, by the processing system, the background video content stream in one or more displays.

Figure 1:
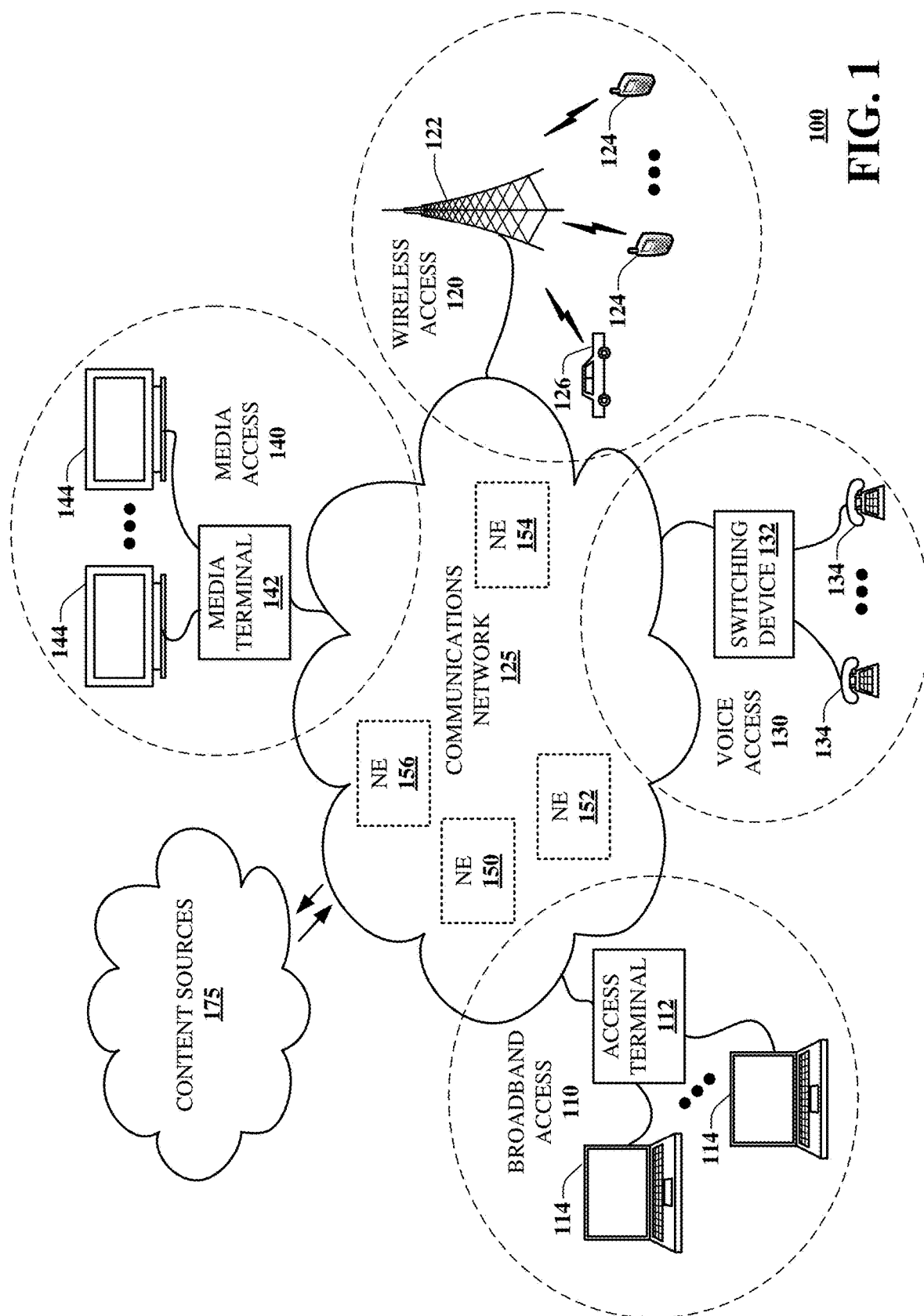
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part delivery of immersive media content, creating and rendering foreground video content from the immersive media content, determining a collective point-of-view (PoV) of an audience of viewers, generating background video content from the immersive media content based on distance to viewers in the audience, and displaying the background video content on ubiquitous displays. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
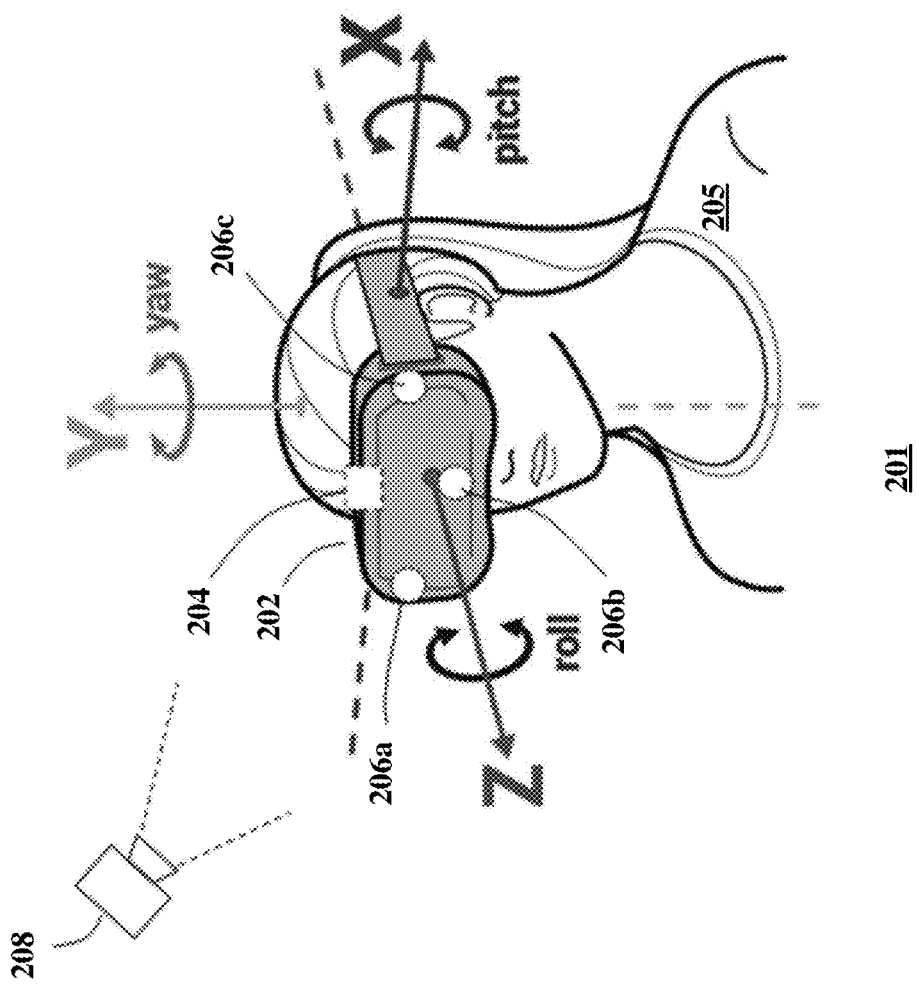
FIG. 2A depicts an illustrative embodiment of an immersive media viewing device.

FIG. 2A depicts an illustrative embodiment of an immersive media viewing device 201. As shown in FIG. 2A, a local viewer 205 wearing a virtual reality (VR) or augmented reality (AR, collectively XR) head-mounted display (HMD) 202 can adjust her orientation by changing the pitch, yaw, and/or roll of the HMD 202, which correspond to rotating along one or more of the X, Y, and Z axes, respectively. She can also adjust her position by moving along one or more of the X, Y, and Z axes, respectively. Then a video player, e.g., within the HMD 202, computes and displays a viewing area, i.e., a display surface, based on the orientation and the field of view (FoV). The FoV can define an extent of the observable area, which is usually a fixed parameter of a VR head-mounted display (e.g., 110° horizontally and 90° vertically).

The example HMD 202 can be equipped with a position and/or orientation sensor 204, such as position/orientation sensors available on smartphones, gaming goggles and/or tablet devices. Alternatively, or in addition, the HMD 202 includes one or more reference markers 206a, 206b and 206c (generally 206). The reference markers 206a, 206b, 206c are spaced apart in a predetermined configuration. An external sensor, such as a video camera 208, is positioned to observe the HMD 202 during active use. The video camera 208 detects positions of the reference markers. Further processing, e.g., by an orientation detector can determine a position and/or orientation of the HMD 202 based on the detected/observed positions of the reference markers 206. In another embodiment, HMD 202 may comprise a position tracking signal supplied to video camera 208.

As a vital component of the XR technology, immersive media content provides viewers 205, 207 with panoramic views allowing them to freely control their viewing position and direction during video playback. Usually, HMD 202 displays only the visible portion of immersive media content. Thus, fetching the entire raw video frame wastes bandwidth. The techniques disclosed herein address the problem of providing immersive media content delivery over wireless, e.g., cellular, networks, to multiple viewers.

Conceptually, a novel cellular-friendly streaming scheme for immersive media content avoids downloading an entire video, instead only fetching those parts, e.g., spatial segments or portions, of the video that are visible to the viewers 205, 207 in order to reduce bandwidth consumption associated with the video transfer. As display of any of the portion of the video requires that the portion be fetched or otherwise downloaded, the disclosed approach benefits from a prediction of a viewer's head movement (to determine which portion of the video view to fetch). Trace-driven analysis indicated that, at least in the short term (e.g., <0.1s), a viewers' head movement can be accurately predicted, e.g., with an accuracy >90%, by even using simple methods such as trajectory extrapolation.

Figure 2B:
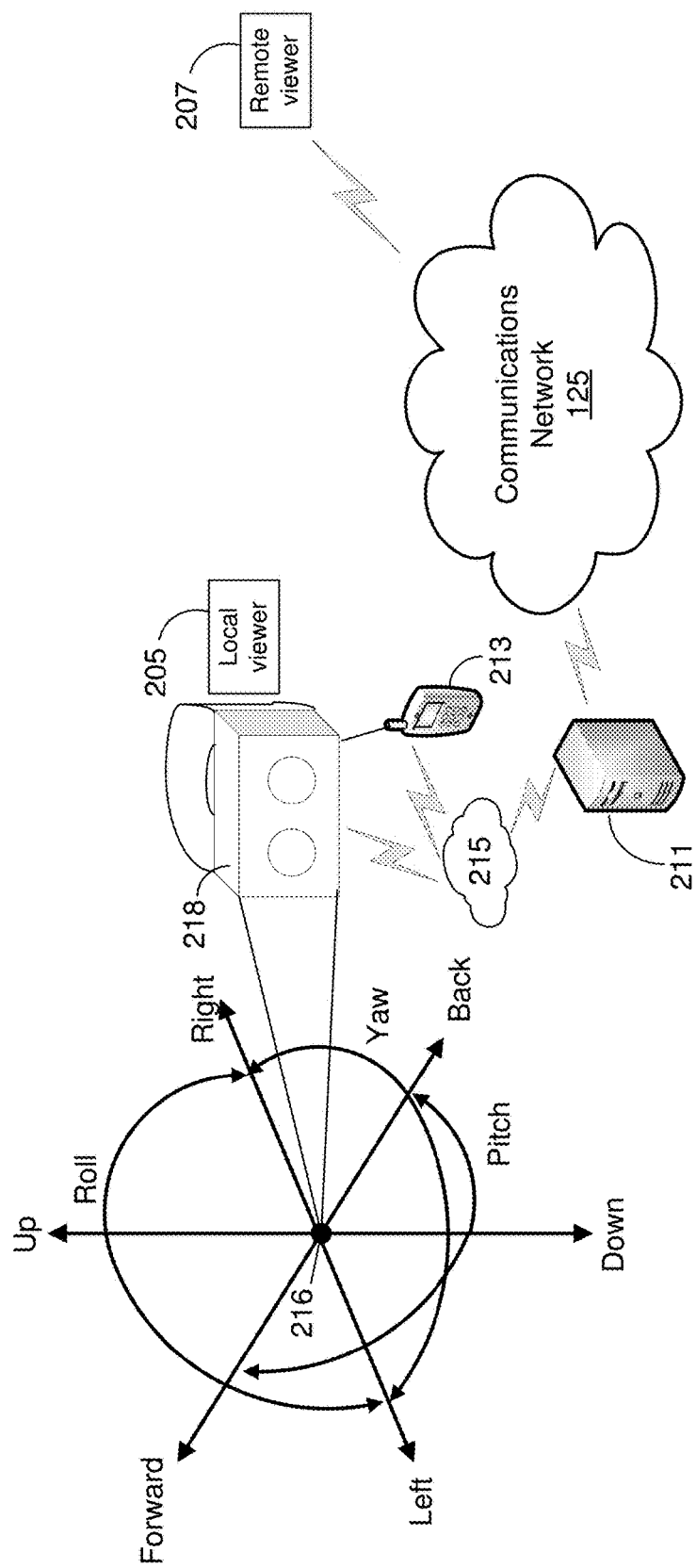
FIG. 2B is a block diagram illustrating an example, non-limiting embodiment of a system functioning within the communication network of FIG. 1 in accordance with various aspects described herein.

FIG. 2B is a block diagram illustrating an example, non-limiting embodiment of a system 210 functioning within the communication network of FIG. 1 in accordance with various aspects described herein. Referring to FIG. 2B, in one or more embodiments, a system 210 can include a video content server 211 that provides immersive media content over communication network 215 to equipment of a local viewer 205 including a media device 213 communicatively coupled to a head-mounted display 218. In some embodiments, the head-mounted display 218 can be a VR head-mounted display, an augmented reality (AR) head-mounted display, an accelerometer, or other sensors that indicate position and head orientation, as described above. In another embodiment the HMD manifests in the form of glasses or goggles with a semi-transparent screen that allows a user to both see through the display screen as well as the system to create visuals on the screen such that that a foreground (the screen) and background (the unaltered world, including other displays) are visible. In an embodiment, the immersive media content can be volumetric video content that can be viewed or presented using the head-mounted display 218. In another embodiment, video content server 211 that provides immersive media content over communication network 125 to equipment of a remote viewer 207, where the remote viewer equipment (not illustrated) is similar to that of the local viewer 205 described above and further described below. Such immersive media content delivery may be synchronized with delivery to the local viewer 205. In further embodiments, the media device 213, such as a smartphone, can be coupled to the head-mounted display 218 to view the immersive media content. In other embodiments, the video content server 211 can provide the video content over the communication network to the media device 213 communicatively coupled to a display to present the video content. In additional embodiments, the video server can be a media content server, a social media server, a gaming server, web server, or any other server that provides video content. In further embodiments, the media device can be a mobile device (e.g., smartphone, tablet computer, laptop computer, etc.) or any other media device (e.g., television, desktop computer, set top box, media processor, etc.).

In one or more embodiments, immersive media content viewed on the display of the head-mounted display 218 can be presented from a viewpoint 216 within the immersive media content. A viewer 205, 207 wearing the head-mounted display 218 can view different perspectives of the immersive media content by moving the viewer's head in a particular direction. For example, if a viewer 205, 207 pitches her head upward, then the video content is adjusted to provide the perspective toward the top of the video. The viewer 205, 207 can also rotate her head to the left or right (yaw) or roll her head. But she can also move the location up or down, right or left, forward or back, which enables watching a scene in the immersive media content from different virtual locations.

However, rendering high quality 2D images from immersive media content in real-time according to viewer's free viewpoint input is a computationally intensive task. In some embodiments, the media device 213 may lack the computational power, thus requiring remote powerful machines to compute the graphics. This brings another demand for high bandwidth and low latency communication networks 125, 215, in order to stream back the rendering results in time (considering a 30 frame per second movie would require rendering and streaming total latency lower than 33 ms per video frame). In some embodiments, the communication networks 125, 215 may be a cellular network or a Wi-Fi network with limited available bandwidth and high latency. Furthermore, delivery of immersive media content to multiple viewers 205, 207 at the same time, whether they are in the same location, or in distinct locations, leads to additional challenges. 3D viewing technology has not become widespread, perhaps due to its limited immersion (a single 2D screen) and static rendering nature.

Figure 2C:
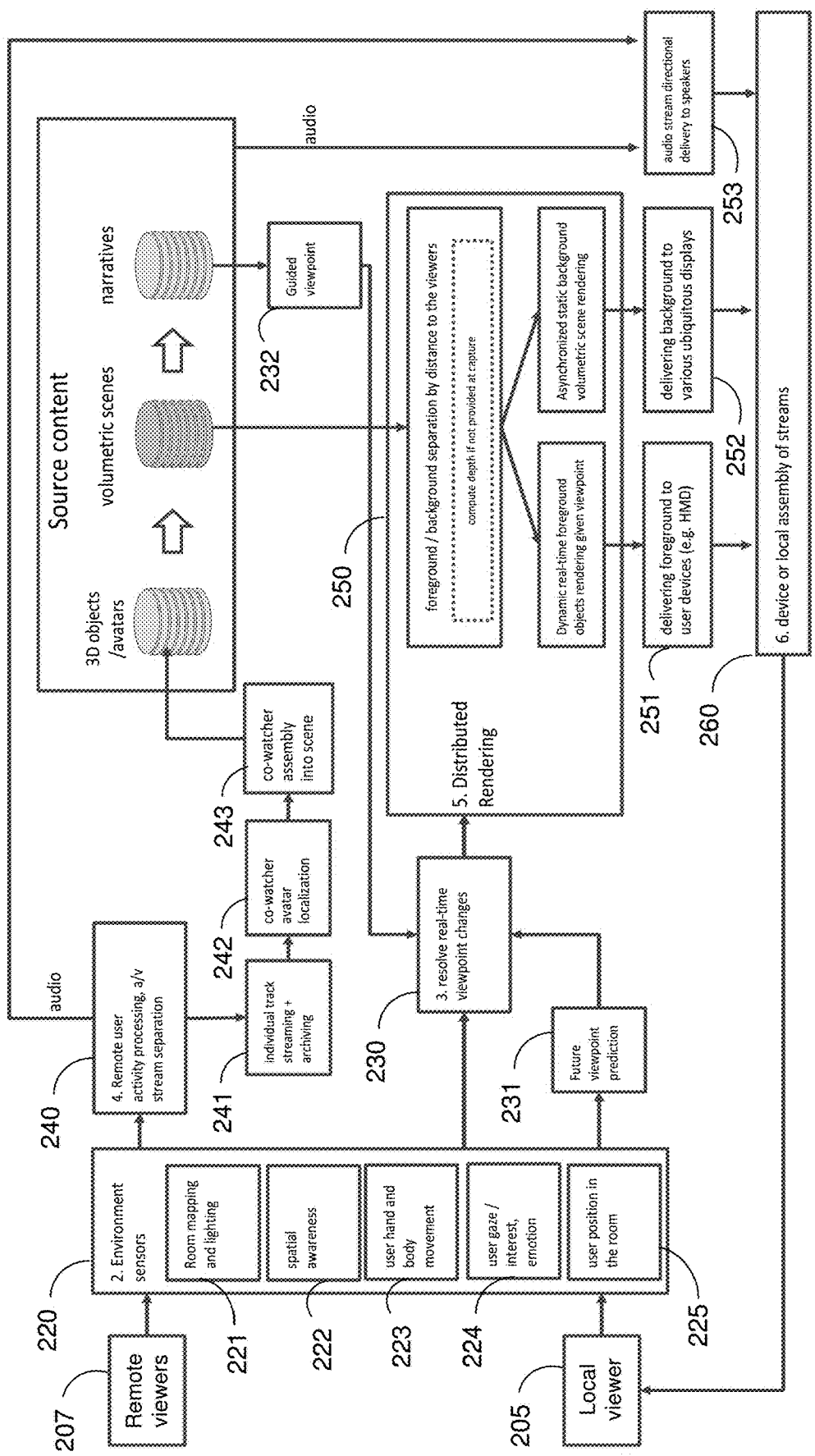
FIG. 2C is a block diagram illustrating an example, non-limiting embodiment of a social immersive content rendering system functioning within the communication network of FIG. 1 in accordance with various aspects described herein.

FIG. 2C is a block diagram illustrating an example, non-limiting embodiment of a social immersive content rendering system 200 functioning within the communication network of FIG. 1 in accordance with various aspects described herein. Referring to FIG. 2B, in one or more embodiments, system 200 comprises sensors and processing equipment to provide viewers in local and remote locations with the ability to watch immersive media content together. In an embodiment, system 200 comprises audience displays utilizing theater surrounding screens, movable light emitting diode display walls, and/or AR or VR head-mounted displays to distribute immersive media content according to distance, allowing participation from traditional media theaters as well as high-end home systems. System 200 provides an immersive cinematic experience for personalized viewpoints by allowing a spatial and interactive experience inside of content (spatial placement versus characters and camera) for numerous angles of enjoyment. System 200 creates unified connectivity for coordinated viewing—bridging with a standard protocol, to join theaters and home environments for new immersive, synchronous experience.

System 200 comprises environment sensors 220, viewpoint processing subsystem 230, objects and avatars generation subsystem 240, distributed rendering subsystem 250, and local stream assembly subsystem 260. In an embodiment, system 200 may provide standardization for traditionally expensive scenic automation in theme parks and large venues—using ubiquitous display technology and targeted stream delivery (e.g., specific viewport, directed audio, and friends), which allows deeper immersion across any immersive media content.

Environment sensors 220 comprise room mapping and lighting 221, spatial awareness sensors 222, viewer hand and body movement sensors 223, viewer gaze, interest and emotion sensors 224, and viewer position sensors 225. The environment sensors 220 gather information about the room and the viewers and objects within the room. For example, room mapping and lighting 221 and spatial awareness sensors 222 determine objects in the room, such as furniture, etc. In an embodiment, viewer hand and body movement sensors 223 and viewer position sensors 225 keep track of the location and orientation of viewers and objects within the room. In an embodiment, viewer gaze, interest and emotion sensors 224 observe each viewer's gaze, their interest in the immersive media content and each other, and their emotions. Processing separates audio signals utterances (chatting) and volumetric appearance (e.g., an avatar) for each viewer. Each viewer's activity is serialized as an individual time-aligned track with the immersive media content. Information generated by environment sensors 220 is delivered to viewpoint processing subsystem 230 and objects and avatars generation subsystem 240.

Viewpoint processing subsystem 230 comprises a future viewpoint prediction module 231. In an embodiment, viewpoint processing subsystem 230 computes the collective viewpoint intention of the audience, where said collective viewpoint may deviate from the original/creator's camera viewpoint. Current and future gaze directions are predicted by future viewpoint prediction module 231 using aggregates of all viewers and individual's recent trajectory. In an embodiment, future viewpoint prediction module 231 predicts future viewpoints of each viewer using techniques such as those disclosed in U.S. Pat. No. 10,623,791, entitled "Field of View Prediction in Live Panoramic Video Streaming." U.S. Pat. No. 10,735,882, entitled "Method of Audio-Assisted Field of View Prediction for Spherical Video Streaming." and U.S. Pat. No. 10,827,225, entitled "Navigation for 360-Degree Video Streaming," each of which is incorporated by reference herein. In an embodiment, viewpoint processing subsystem 230 computes a combined immersive media content viewpoint from creator and audience in real-time. In an embodiment, the viewpoint processing subsystem 230 sends the combined immersive media content viewpoint to the distributed rendering subsystem 250 to render the point-of-view (PoV) for the immersive media content presented to viewers lacking a VR head-mounted display. By determining a collective PoV, system 200 optimizes distributed computational burden for rendering 3D scenes—one shared 3D background provided to many viewers (in a locality) saves computations and bandwidth resources from individual streaming and display, while providing the foreground of the 3D scene rendered in different viewpoints, as set forth in more detail below.

In another embodiment, the immersive media content may provide a guided PoV 232 to the distributed rendering subsystem 250. In yet another embodiment, each local viewer 205 may be using an AR/VR head-mounted display, in which case the combined immersive media content viewpoint would not need to be provided for rendering the immersive media content on each of their individual AR/VR head-mounted displays. However, the combined immersive media content viewpoint could be forced upon said viewers in certain circumstances, e.g., where a narrative in the immersive media content requires such a guided PoV 232.

Objects and avatars generation subsystem 240 identifies objects and avatars for display from individual serialized tracks 241 in the immersive media content. Remote or virtual audience members and objects are continuously loaded via remote stream designations. Objects and avatars generation subsystem 240 adjusts the spatial position of each remote stream avatar to answer requests of several viewers and individuals (i.e., virtual audience seating). Objects and avatars generation subsystem 240 spatially places objects (i.e., localization 242) from source and within a local viewing room (chairs, environment constraints, etc.) for immersive media content scene processing, i.e., integrating 243 the presence of the objects and avatars for remote viewers 207 into the immersive media content, and interactions therewith. In an embodiment, objects and avatars generation subsystem 240 spatially delegates some objects and avatars into the background video content stream, to be rendered by ubiquitous wall displays.

Distributed rendering subsystem 250 loads volumetric scenes from the immersive media content. Using distributed computing and within GPU memory 3D-to-2D video transcoding, distributed rendering subsystem 250 creates views in different viewpoints for multiple connected viewers in the audience. Shared screens are determined by best "aggregate" background video content view, and individual head-mounted displays show only foreground objects separated from the background, which allows 6DoF inspection.

In an embodiment, AR head-mounted displays augment the view of background video content displayed on all surfaces of a room. In another embodiment, data provided by the environment sensors 220 permit distributed rendering subsystem 250 to compute spatial awareness (background separation) of the content objects and viewers in the audience. In an embodiment, for non-volumetric content, distributed rendering subsystem 250 computes depth of objects in the content. Distributed rendering subsystem 250 assembles the various inputs of scene, avatars, and objects, and delivers streams to user-proximal devices and ubiquitous, local displays. In an embodiment, system 200 can distribute content directed to education and tourism—thereby improving virtual classroom interactions, both for bringing remote socialization together as well as determining better viewpoints for viewers who are following one single volumetric capture of immersive media content but want their own viewing angles.

As mentioned above, in an embodiment, distributed rendering subsystem 250 separates foreground video content of the immersive media content from background video content, based on a virtual distance from the viewers. Optionally, distributed rendering subsystem 250 calculates the distance of objects in the immersive media content, if not provided by the immersive media content. Next, foreground processing 251 of distributed rendering subsystem 250 dynamically renders foreground objects in real time for any given viewpoint, i.e., viewer, and provides a foreground video content stream to viewer devices, such as VR head-mounted displays. Foreground video processing 251 may also integrate virtual objects from another location, like an avatar for a remote viewer 207.

Additionally, background processing 252 of distributed rendering subsystem 250 determines an asynchronous, and perhaps static backgrounds from the background video content of the immersive media content, renders scenes in remarkably high quality and resolution, and provides a high-quality, high-resolution background video content stream to viewer devices. In an embodiment, the distributed rendering system may separate the immersive media content into more than two layers, i.e., foreground and background.

In addition, audio processing 253 of distributed rendering subsystem 250 may blend spatially directed audio from objects and avatars generation subsystem 240 and from the immersive media content. In an embodiment, such blending may simulate the location of an avatar for a remote viewer 207 within the room or locality that the local viewer 205 is experiencing the immersive media content. In another embodiment, noises from certain viewers may be attenuated or blocked. In yet another embodiment, personalized audio may be blended for one user and removed from other user's experiences. For example, audio from a concurrent, but private, phone call, assistive or enablement audio in another language or with more description, or audio intended for the world outside of the rendered experience 200 can be blended in individual channels without disrupting the combined experience of other local viewers 205 or the remote viewers 207.

Local stream assembly subsystem 260 assembles the foreground video content stream, the background video content stream, and the audio stream, synchronously, in real-time. In an embodiment, local stream assembly subsystem 260 comprises ubiquitous wall-to-ceiling displays to render the background video content stream. In an embodiment, AR head-mounted displays can fully immerse viewers interacting with the foreground video content stream. In an embodiment, viewers using AR head-mounted displays will have the ability to physically move arbitrarily within a scene, which can become a dynamic consumption experience. In another embodiment, viewers using VR head-mounted displays can virtually move within the scene. Viewers in the audience can explore the rich volume of immersive media content by moving among its captured points while they jointly decide which regions to explore next. If available, local stream assembly subsystem 260 delivers objects and avatars that were not suitable for combined (ubiquitous) rendering to the viewer either through a VR head-mounted display or via room-based beam forming and displays. In an embodiment, local stream assembly subsystem 260 delivers spatially directed audio within the capability of the audio system. Hence, local stream assembly subsystem 260 facilitates an exchange of first audio from the first viewer and second audio from the second viewer. In an embodiment, local stream assembly subsystem 260 merges remote audio of viewer activity, i.e., human utterances/noises (clapping, etc.) with audio signals from the immersive media content. In an embodiment, local stream assembly subsystem 260 may facilitate visually replace unrecognized persons. In another embodiment, local stream assembly subsystem 260 may use signal separation to remove background noise or chatter. Where viewers are located remotely, local stream assembly subsystem 260 ensures that content is delivered to remote locations synchronously, so that rendering is performed simultaneously at all locations.

Figure 2D:
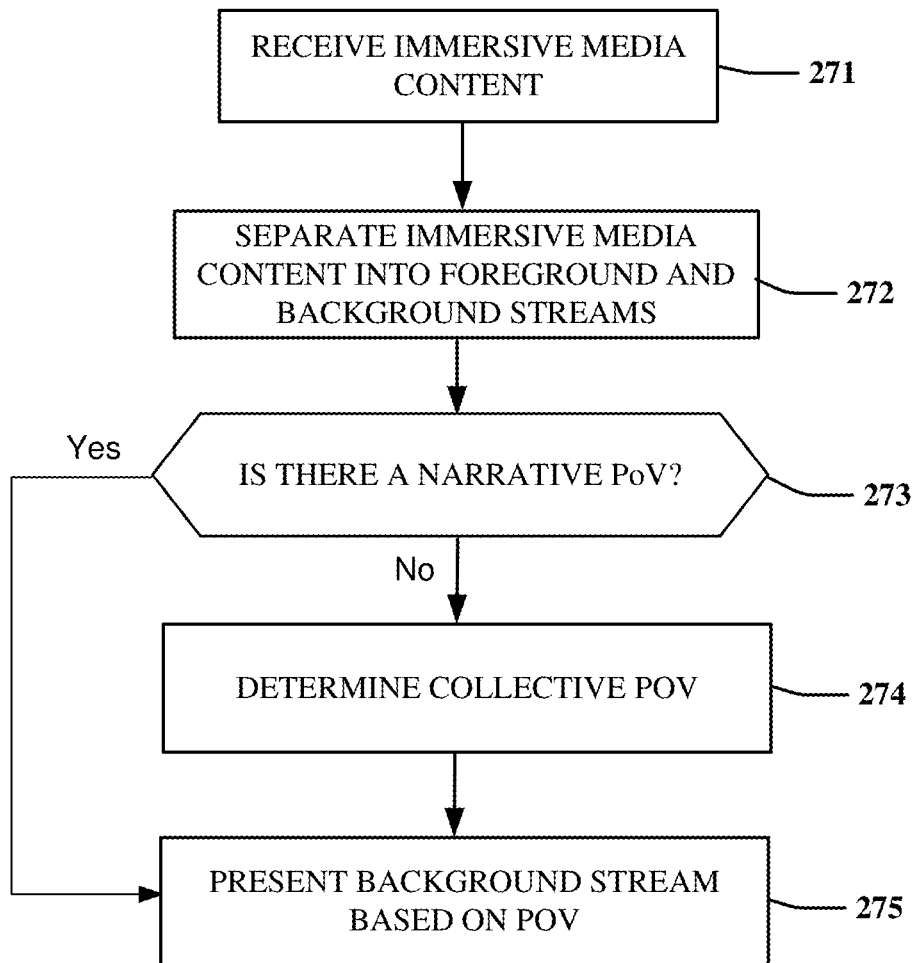
FIG. 2D depicts an illustrative embodiment of a method in accordance with various aspects described herein.

FIG. 2D depicts an illustrative embodiment of a method in accordance with various aspects described herein. As shown in FIG. 2D, method 270 begins at step 271, where the system receives immersive media content. At step 272, the system separates the immersive media content into foreground information and background video content stream based on a distance to viewers in the audience.

In step 273, the system checks to determine whether the immersive media content includes a narrative point-of-view (PoV). If so, the process skips step 274. If not, in step 274, the system determines a collective PoV from individual PoVs of viewers in the audience. In an embodiment, the system selects a PoV of an individual viewer for the collective PoV. In another embodiment, the system merges the individual PoVs to determine the collective PoV.

In step 275, the system presents the background video content stream on ubiquitous displays. In an embodiment, the system merges the background video content stream with a rendering of foreground information stream on one or more HMDs.

While for purposes of simplicity of explanation, the respective processes are shown and described as a series of blocks in FIG. 2X, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 270 presented in FIGS. 1, 2A, 2B, 2C and 2D. For example, virtualized communication network 300 can facilitate in whole or in part delivery of immersive media content, creating and rendering foreground video content from the immersive media content, determining a collective point-of-view (PoV) of an audience of viewers, generating background video content from the immersive media content based on distance to viewers in the audience, and displaying the background video content on ubiquitous displays.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward substantial amounts of traffic, their workload can be distributed across a number of servers—each of which adds a portion of the capability, and which creates an overall elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
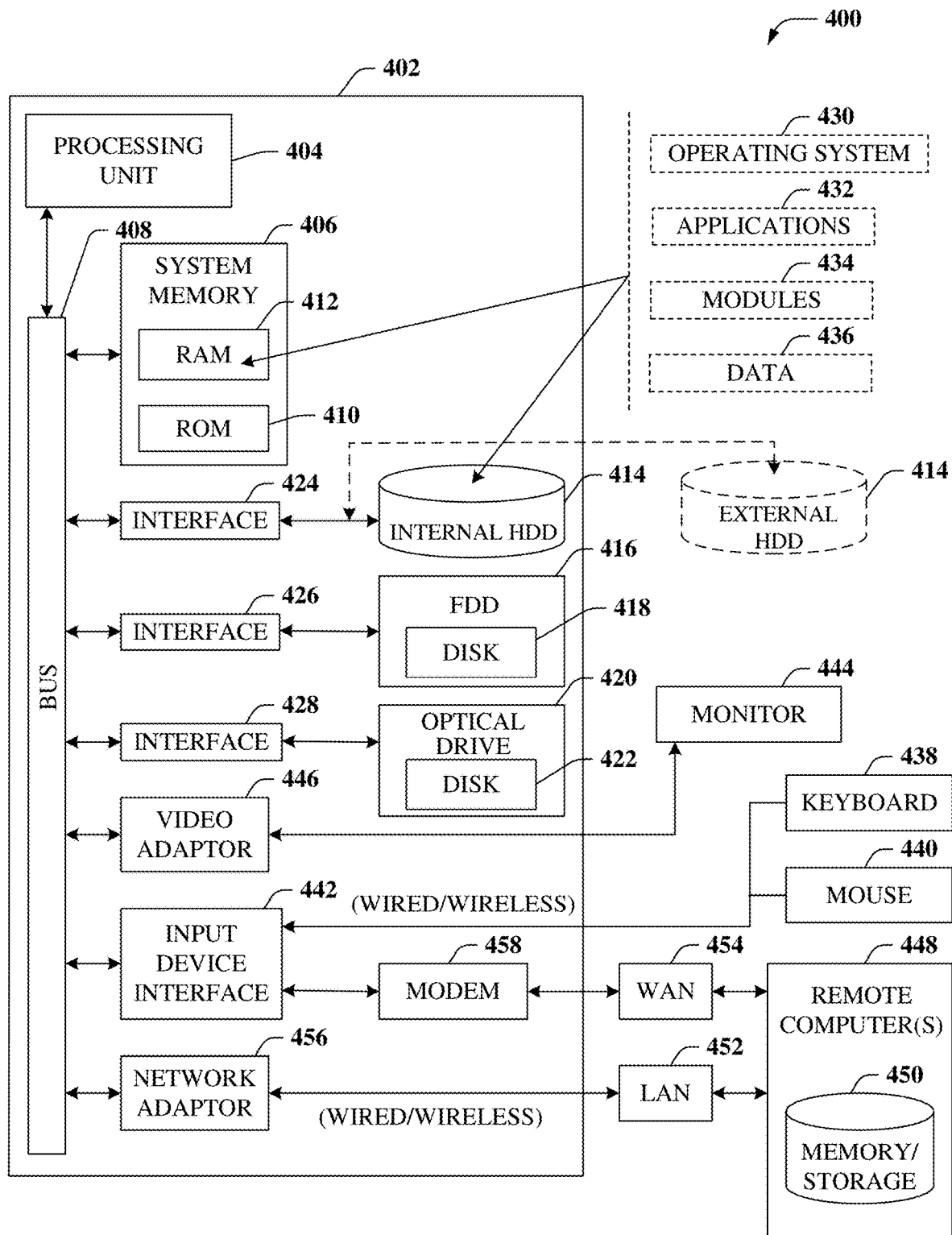
FIG. 4 is a block diagram of an example, non-limiting embodiment of a computing environment in accordance with various aspects described herein.

FIG. 4 illustrates a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part delivery of immersive media content, creating and rendering foreground video content from the immersive media content, determining a collective point-of-view (PoV) of an audience of viewers, generating background video content from the immersive media content based on distance to viewers in the audience, and displaying the background video content on ubiquitous displays.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A viewer can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
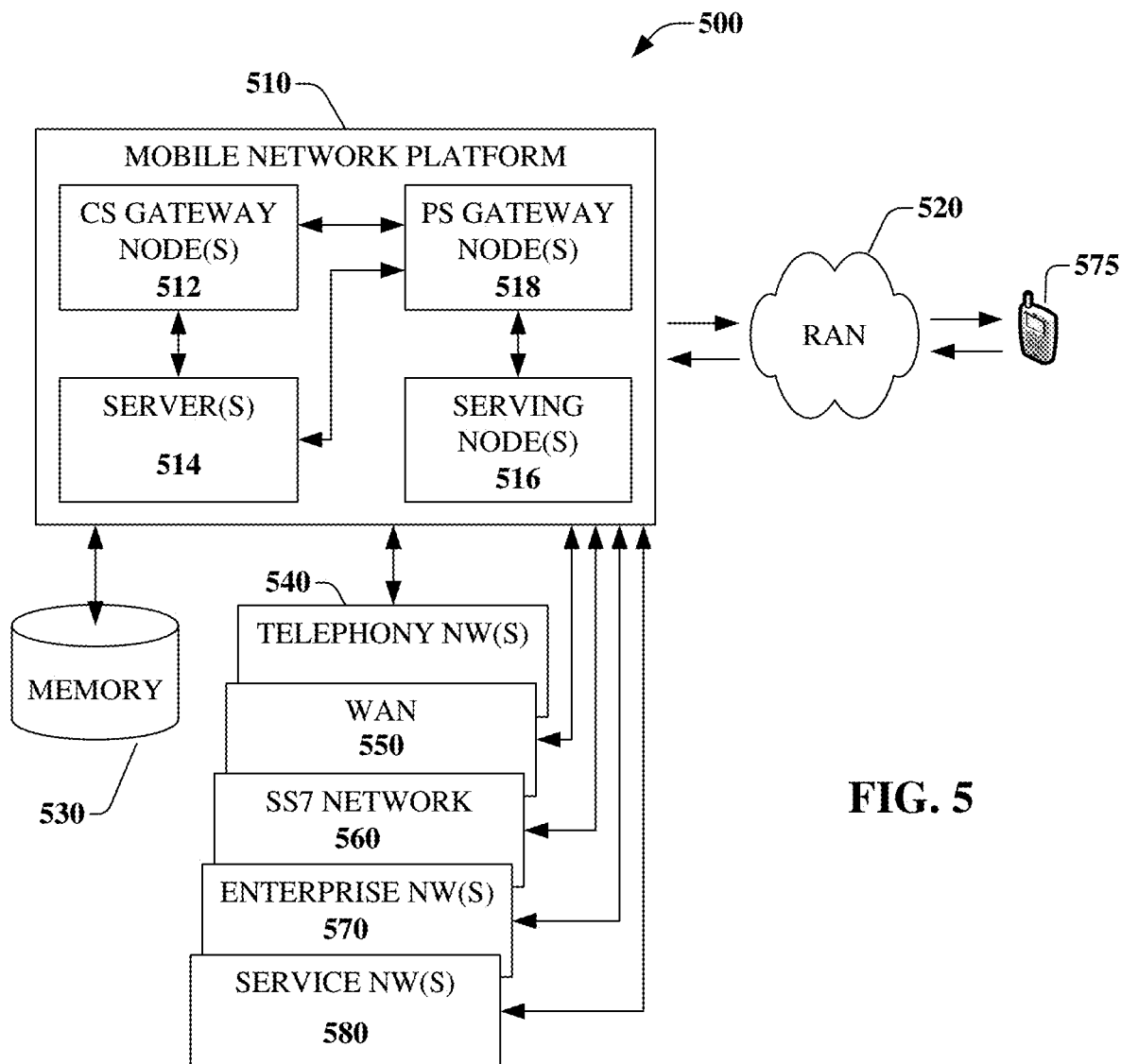
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part delivery of immersive media content, creating and rendering foreground video content from the immersive media content, determining a collective point-of-view (PoV) of an audience of viewers, generating background video content from the immersive media content based on distance to viewers in the audience, and displaying the background video content on ubiquitous displays. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
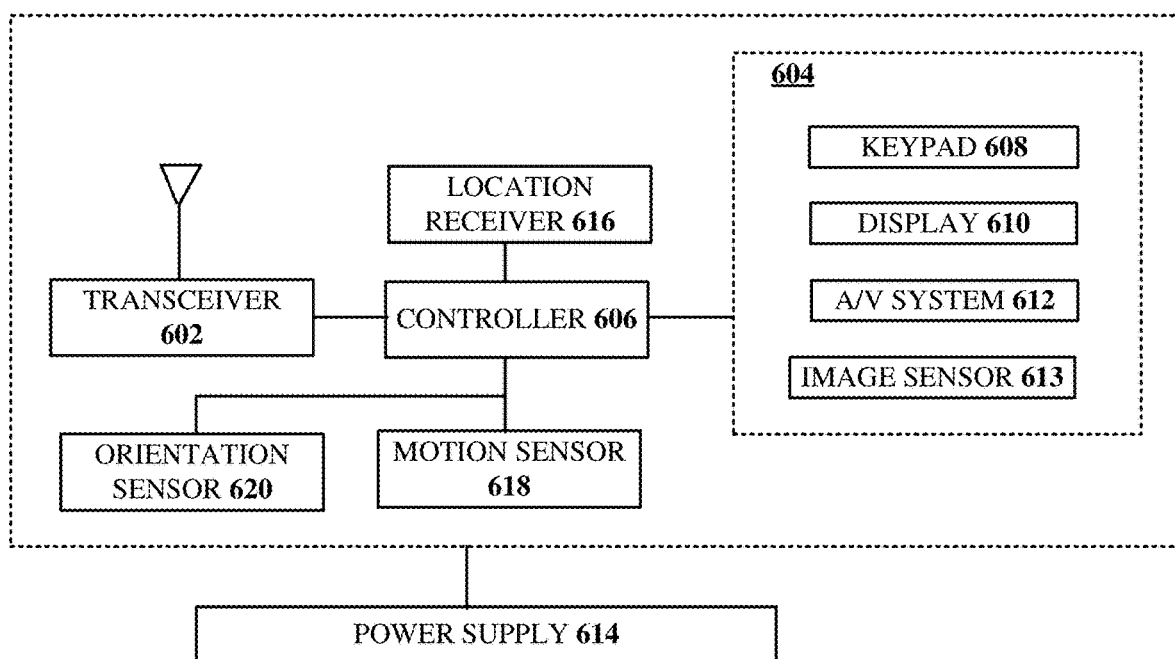
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part delivery of immersive media content, creating and rendering foreground video content from the immersive media content, determining a collective point-of-view (PoV) of an audience of viewers, generating background video content from the immersive media content based on distance to viewers in the audience, and displaying the background video content on ubiquitous displays.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database." and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for conducting various embodiments thereof. Moreover, the classifier can be employed to determine a ranking or priority of each cell site of the acquired network. A classifier is a function that maps an input attribute vector, $X=(x_1, x_2, x_3, x_4 \ldots x_n)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component." "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer." "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to." and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A system, comprising:
    a processing system including a processor; and
    a memory that stores executable instructions that, when executed by the processing system, facilitate performance of operations, the operations comprising:
        receiving a first point-of-view (PoV) of a first viewer operating a first display device and a second PoV of a second viewer operating a second display device;
        determining an aggregated PoV from a first predicted PoV of the first viewer and a second predicted PoV of the second viewer;
        separating a background video content in immersive media content from a foreground video content of the immersive media content based on a virtual distance of the aggregated PoV from the foreground video content;
        creating a first portion of the background video content based on the aggregated PoV;
        displaying the first portion of the background video content on surfaces of a room comprising the first viewer;
        augmenting a view of the first viewer with foreground information for rendering the foreground video content by the first display device, wherein the first display device is an augmented reality head-mounted display; and
        sending the foreground information and the first portion of the background video content to the second display device.

2. The system of claim 1, wherein the first display device and the second display device render the foreground information and the background video content in a synchronous manner.

3. The system of claim 2, wherein the rendering of the foreground information and the background video content is synchronous to an audio signal.

4. The system of claim 3, wherein the first display device and the second display device are head-mounted displays.

5. The system of claim 4, wherein the first display device and the second display device are at distinct locations.

6. The system of claim 5, wherein the operations further comprise facilitating an exchange of first audio from the first viewer and second audio from the second viewer.

7. The system of claim 6, wherein the processing system comprises a plurality of processors operating in a distributed computing environment.

8. The system of claim 7, wherein the background video content is computed based on the virtual distance.

9. A non-transitory, machine-readable medium, comprising executable instructions that, when executed by a processing system including a processor, facilitate performance of operations, the operations comprising:
    receiving a first point-of-view (PoV) of a first viewer operating a first display device and a second PoV of a second viewer operating a second display device;
    determining an aggregated PoV from a first predicted PoV of the first viewer and a second predicted PoV of the second viewer;
    separating a background video content in immersive media content from a foreground video content based on a virtual distance of the aggregated PoV from the foreground video content;
    creating a first portion of the background video content and sending the first portion and the foreground video content to the first display device, wherein the first portion is based on the aggregated POV; and
    sending the foreground video content to the second display device.

10. The non-transitory, machine-readable medium of claim 9, wherein the operations further comprise displaying the first portion of the background video content on a surface of a room comprising the first viewer and augmenting a view of the first viewer with the foreground video content by the first display device, wherein the first display device is an augmented reality head-mounted display.

11. The non-transitory, machine-readable medium of claim 10, wherein the first display device and the second display device render the foreground video content and the background video content in a synchronous manner.

12. The non-transitory, machine-readable medium of claim 11, wherein rendering of the foreground video content and the background video content is synchronous to an audio signal.

13. The non-transitory, machine-readable medium of claim 12, wherein the first display device and the second display device are head-mounted displays.

14. The non-transitory, machine-readable medium of claim 13, wherein the first display device and the second display device are at distinct locations.

15. The non-transitory, machine-readable medium of claim 14, wherein the operations further comprise facilitating an exchange of first audio from the first viewer and second audio from the second viewer.

16. The non-transitory, machine-readable medium of claim 9, wherein the processing system comprises a plurality of processors operating in a distributed computing environment.

17. The non-transitory, machine-readable medium of claim 9, wherein the operations further comprise sending the first portion of the background video content to the second display device.

18. A method, comprising:
receiving, by a processing system including a processor, a first point-of-view (PoV) of a first viewer of immersive media content operating a first display device and a second PoV of a second viewer operating a second display device;
determining, by the processing system, an aggregated PoV from a first predicted PoV of the first viewer and a second predicted PoV of the second viewer;
separating, by the processing system, a background video content in the immersive media content from foreground video content based on a virtual distance of the aggregated PoV from the foreground video content;
creating a first portion of the background video content and sending the first portion to the first display device, wherein the first portion is based on the aggregated PoV; and
sending the foreground video content and the first portion of the background video content to the second display device.

19. The method of claim 18, further comprising: displaying, by the processing system, the first portion of the background video content on a surface of a room comprising the first viewer and augmenting a view of the first viewer with foreground information for rendering the foreground video content by the first display device, wherein the first display device is an augmented reality head-mounted display.

20. The method of claim 18, wherein the first display device and the second display device are at distinct locations.

* * * * *